United States Patent
Naoe et al.

(10) Patent No.: US 6,534,168 B2
(45) Date of Patent: *Mar. 18, 2003

(54) MAGNETIC RECORDING MEDIUM COMPRISING A LOWER LAYER CONTAINING SPECIFIC FLAT ACICULAR α-IRON OXIDE POWDER

(75) Inventors: Koji Naoe, Kanagawa (JP); Kiyomi Ejiri, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/938,400

(22) Filed: Aug. 23, 2001

(65) Prior Publication Data

US 2002/0119346 A1 Aug. 29, 2002

(30) Foreign Application Priority Data

Aug. 25, 2000 (JP) ........................................ 2000-255365

(51) Int. Cl.$^7$ .................................................. B32B 5/16
(52) U.S. Cl. ................................ 428/329; 428/694 BS; 428/900
(58) Field of Search ........................... 428/694 BS, 328, 428/329, 900

(56) References Cited

U.S. PATENT DOCUMENTS 5,637,390 A  *  6/1997  Isobe et al. .................. 428/323
5,985,408 A  * 11/1999  Ejjiri et al. .................. 428/141
6,440,545 B1 *  8/2002  Hisano et al. ............... 428/216

\* cited by examiner

*Primary Examiner*—H. Thi Le
(74) *Attorney, Agent, or Firm*—Stroock & Stroock & Lavan LLP

(57) ABSTRACT

Provided is a magnetic recording medium exhibiting a high C/N (low noise) ratio in high-density magnetic recording. A magnetic recording medium which comprises a nonmagnetic lower layer comprising a nonmagnetic powder and a binder and a magnetic layer comprising a ferromagnetic powder and a binder provided in this order on a flexible nonmagnetic support. The nonmagnetic lower layer comprises flat acicular α-iron oxide powder with a major axis length ranging from 0.05 to 0.5 μm and a ratio of the major width to the minor width (major width/minor width) of the minor axis cross-section when sectioned at an angle perpendicular to the major axis is equal to or higher than 1. The granular nonmagnetic particles have a mean particle diameter equal to or less than 0.04 μm.

11 Claims, No Drawings

MAGNETIC RECORDING MEDIUM COMPRISING A LOWER LAYER CONTAINING SPECIFIC FLAT ACICULAR α-IRON OXIDE POWDER

FIELD OF THE INVENTION

The present invention relates to a magnetic recording medium exhibiting high output and a good C/N ratio in high-density recording.

RELATED ART

In recent years, recording wavelengths have tended to shorten as recording densities have increased. However, the problem of so-called self-magnetization loss where output drops when recording with a short wavelength on a thick magnetic layer has become significant. Thus, the magnetic layer has been reduced in thickness. However, in particulate magnetic recording media, when a magnetic layer equal to or less than 2 μm in thickness is directly coated onto a support, the nonmagnetic support tends to affect the surface of the magnetic layer. As a result, deterioration of electromagnetic characteristics and dropout tend to appear. This problem is solved by a method employing a simultaneous multilayer coating method in which a nonmagnetic layer is provided as a lower layer and magnetic coating liquid with high concentration is thinly applied (for example, see Japanese Unexamined Patent Publication (KOKAI) Showa Nos. 63-191315 and 63-187418). Such inventions have made it possible to achieve particulate magnetic recording media having good electromagnetic characteristics with dramatically improved yields.

In recent popular digital VCR systems and the like, the need to further reduce medium noise in particulate magnetic recording media has emerged. In popular digital VCR systems, surface roughness has been found to affect medium noise at a wavelength pitch of about 4 μm. Further, high output and suitability to overwriting (O/W) is being demanded of the tapes employed in popular digital VCR systems, resulting in further reduction in thickness of the magnetic layer to about 0.1 μm. When the thickness of the magnetic layer is reduced in this manner, for example, the effects on the surface properties of the magnetic layer of factors resulting from the magnetic layer such as aggregation of the magnetic material and orientational turbulence are reduced, with the surface properties of the lower nonmagnetic layer determining the surface properties of the magnetic layer.

Known methods of smoothing the surface of the lower nonmagnetic layer include, for example, the method of employing acicular particles in the lower layer nonmagnetic powder described in Japanese Unexamined Patent Publication (KOKAI) Heisei No. 4-325915, and the method of employing scale-like particles or plate-shaped particles in the lower layer nonmagnetic powder described in Japanese Patent No. 2,698,770. However, in these methods, it is difficult to reduce roughness at a wavelength pitch of from several μm to several tens of μm. Further, when the thickness of magnetic recording tapes is reduced, that is, when the tape length is increased, it is possible to increase the volume density and achieve high density. However, it has been necessary to reduce the thickness of the support relative to metal evaporation (ME) tapes in magnetic recording tapes having a lower nonmagnetic layer such as the present inventions. As the support has been thinned, high-strength supports extended in the direction of width (TD) have come to be employed to achieve good head contact and ensure running durability. However, when such supports develop minute scratches, they tend to sever during coating, calendering, and slitting steps, so that the yield deteriorates, and there are problems with production properties.

From these perspectives, in magnetic recording tapes having a lower nonmagnetic layer, the demand for further thinning of the lower layer is increasing. However, when the lower layer is thinned in the layer configurations described in Japanese Unexamined Patent Publication (KOKAI) Heisei No. 4-325915 and Japanese Patent No. 1698770, calendering molding properties decrease, the effects of protrusions appear on the support surface, aggregates form in the upper and lower layers, additives such as abrasives are exposed, the surface of the magnetic layer is roughened, output drops, and noise increases. In particular, when the lower layer is thinned to 0.1 to 0.5 μm, these effects become marked.

Accordingly, the object of the present invention is to provide a magnetic recording medium exhibiting a high C/N ratio (low noise) in high-density magnetic recording.

SUMMARY OF THE INVENTION

The present inventors conducted extensive research into achieving the above-stated object in a magnetic recording medium which comprises a nonmagnetic lower layer comprising a nonmagnetic powder and a binder and a magnetic layer comprising a ferromagnetic powder and a binder provided in this order on a flexible nonmagnetic support, resulting in the discovery that a magnetic recording medium exhibiting a high C/N ratio (lower noise) was obtained by incorporating flat acicular α-iron oxide powder and granular nonmagnetic particles into the nonmagnetic lower layer wherein said flat acicular α-iron oxide powder has a major axis length ranging from 0.05 to 0.5 μm and a ratio of the major width m to the minor width k of the minor axis cross-section when sectioned at an angle perpendicular to the major axis (m/k) is higher than 1, and said granular nonmagnetic particles have a mean particle diameter equal to or less than 0.04 μm; the present invention was devised on that basis.

In the magnetic recording medium of the present invention, the use of flat acicular α-iron oxide powder such as set forth above permits inhibition of surface roughness due to vortex flows by increasing the thixotropic properties of the liquid to a greater level than in conventional acicular α-iron oxide powder. Further, the orientation of the nonmagnetic powder can be increased, permitting the production of a smooth surface during coating film formation. However, the increase in orientation of the nonmagnetic powder decreases voids in the coating film, thereby decreasing calender forming properties, resulting in the problem that the surface property cannot be rendered smooth by calendering.

In the present invention, the combined use of the granular nonmagnetic particles, as described above, ensures the presence of voids in the coating film while inhibiting orientation turbulence of the flat acicular α-iron oxide powder. Therefore, a magnetic recording medium is obtained with a smooth magnetic layer surface property during coating film formation and with improved calendering forming properties.

Further, from the perspective of ensuring voids and increasing the thixotropic property of the liquid, the above-described granular nonmagnetic particles are preferably particles that easily form structures. From this perspective, the granular nonmagnetic particles are most preferably carbon black. However, so long as the particles easily form a structure, they may be ceramic oxides such as titanium dioxide or zirconia oxide, or carbon black may be employed in combination with ceramic oxides. Further, from the perspective of ensuring voids and increasing the thixotropic property of the liquid, the above-mentioned flat acicular particles are preferably particles capable of being dispersed in a small quantity of binder, that is, particles having a low specific surface area in spite of small particle size. From this perspective, the flat acicular particles are preferably α-iron oxide rather than iron oxyhydroxide.

One characteristic of the magnetic recording medium of the present invention is that the nonmagnetic lower layer comprises flat acicular α-iron oxide powder. In the present invention, the flat acicular α-iron oxide powder consists of particles with a major axis length ranging from 0.05 to 0.5 µm, and having a ratio of major width to minor width (major width/minor width) of the minor axis cross-section when sectioned at an angle perpendicular to the major axis of greater than 1. When the major axis length of the flat acicular α-iron oxide powder is less than 0.05 µm, the improvement in surface smoothness decreases. Further, flat acicular α-iron oxide powder with a major axis length exceeding 0.5 µm is difficult to manufacture. The preferred range of the major axis length of the flat acicular α-iron oxide is from 0.07 to 0.3 µm. The shape of the minor axis cross-section when sectioned at an angle perpendicular to the major axis of the flat acicular α-iron oxide powder may be elliptic or polyhedral.

Such a flat acicular α-iron oxide powder tends to be formed so that the lengthwise direction thereof is parallel to the support surface during coating of the nonmagnetic lower layer. Further, incorporating the flat acicular α-iron oxide powder into the lower nonmagnetic layer controls orientation turbulence in the nonmagnetic powder in the direction of thickness (direction perpendicular to the tape web) of the nonmagnetic lower layer better than when a metal nonmagnetic powder with a round minor axis cross-section or a scale-like or plate-shaped nonmagnetic powder is employed. That is, the aggregates caused by entangling of nonmagnetic powder particles in conventional acicular nonmagnetic powder (of round cross-section) can be reduced, and the orientation turbulence of nonmagnetic powder in the direction of thickness (direction perpendicular to the tape web) can be improved relative to what it is in scale-like and plate-shaped nonmagnetic powders of short major axis length.

Thus, the surface roughness during coating film formation is reduced, moldability of the nonmagnetic lower layer during calendering is improved, and it becomes possible to smoothen the surface of the magnetic layer.

Japanese Unexamined Patent Publication (KOKAI) Heisei No. 10-340447 describes a magnetic recording medium having a lower nonmagnetic layer comprising flat acicular particles that are of the same type of powder as the flat acicular nonmagnetic powder employed in the present invention. However, this publication does not describe the mixing of flat acicular α-iron oxide powder with particles that easily form structures, such as carbon black, for use. Further, although the above-cited publication describes iron oxyhydroxide (FeOOH) as a flat acicular particle, α-iron oxide is not disclosed as an flat acicular nonmagnetic powder. Additionally, in the above-cited publication, the thickness of the lower nonmagnetic layer is not specified.

As described in Japanese Unexamined Patent Publication (KOKAI) Heisei No. 4-325915 and Japanese Unexamined Patent Publication (KOKAI) Heisei No. 6-236542, the method of employing carbon black in addition to acicular nonmagnetic particles in the lower layer is actually employed from the perspective of ensuring electrostatic properties and the thixotropic properties of the liquid. When a large quantity of carbon black is added to the lower layer liquid to increase the thixotropic property of the liquid, it sometimes becomes difficult to ensure dispersion. Further, as described in Japanese Unexamined Patent Publication (KOKAI) Heisei No. 10-340447, there is a problem with electrostatic charging when carbon black is not added, sometimes resulting in wrinkling and the like during calendering. Further, the thixotropic property of the liquid decreases, the effects of vortex flow tend to appear during coating and drying, and pitch waviness occurs at long wavelengths (equal to or higher than 10 µm), resulting in surface roughness.

The use of flat acicular nonmagnetic powder improves thixotropic properties to a greater degree than the use of conventional acicular nonmagnetic particles. The effect is particularly marked in systems where carbon black is employed in combination. Further, even when the quantity of carbon black is reduced, it is still possible to ensure the thixotropic property of the liquid, permitting improved dispersion. Further, the combined use of carbon black and a ceramic oxide as the granular nonmagnetic particles achieves both dispersibility and thixotropic properties.

Since heat treatments are not conducted at high temperatures for iron oxyhydroxide, there is greater specific surface area and lower compression strength for the same particle size as compared to α-iron oxide. When the specific surface area increases in this manner, the quantity of binder required to ensure dispersibility of the liquid becomes large. When the quantity of binder in the lower layer becomes 30 parts by weight per 100 parts by weight of nonmagnetic powder as in the embodiment described in Japanese Unexamined Patent Publication (KOKAI) Heisei No. 10-340447, it becomes impossible to ensure adequate calendering moldability. Further, when iron oxyhydroxide is employed, there are cases where the acicular particles break during the application of high pressure during the calendering process.

Accordingly, the present inventors sintered and hydrated the flat acicular iron hydroxide described in Japanese Unexamined Patent Publication (KOKAI) Heisei No. 10-340447 and Japanese Unexamined Patent Publication (KOKAI) Heisei No. 10-340805 at 600° C. in an $O_2$ atmosphere, for example, as flat nonmagnetic powder to manufacture flat acicular α-iron oxide.

In the present invention, not only flat acicular α-iron oxide is employed as the lower layer nonmagnetic powder, but also a granular particle such as carbon black is mixed in to ensure electrostatic properties and permit the production of a magnetic recording medium with little surface roughness during coating film formation.

In-the magnetic recording medium of the present invention, the following conditions are preferably satisfied to further enhance the above-described effects of the present invention.

A ratio of the minor width length k of the minor axis cross-section when flat acicular α-iron oxide is sectioned in a direction perpendicular to the major axis thereof to the major axis length 1x of the powder (1x/k) equal to or higher than 5, preferably equal to or higher than 7, and more preferably equal to or higher than 10 is desirable from the perspective of enhancing the thixotropic property of the liquid and reducing displacement in the direction of thickness due to particle stacking.

A ratio of the major width length m of the minor axis cross-section when the flat acicular α-iron oxide is sectioned in a direction perpendicular to the minor width length k (major width length m/minor width length k) exceeding 1, more preferably from 1.5 to 8, and still more preferably from 2 to 5 is desirable from the perspective of facilitating orientation in parallel with the support surface and imparting an ability to receive pressure during calendering.

A ratio of the major axis length 1x of the flat acicular α-iron oxide powder to the mean particle diameter 1y of the granular nonmagnetic powder (1x/1y) equal to or higher than 3, preferably equal to or higher than 5, and more preferably equal to or higher than 10 is desirable from the perspective of inhibiting orientation turbulence due to particle stacking during mixing.

A ratio of the major width length m of the minor axis cross-section when the flat acicular α-iron oxide powder is sectioned in a direction perpendicular to the major axis to the mean particle diameter 1y of the granular nonmagnetic powder (m/1y) of from 0.5 to 10, preferably from 1 to 8, and still more preferably from 2 to 6, is desirable. Thus, it is possible to reduce displacement in the direction of thickness due to particle stacking during mixing, smoothen the surface, and achieve a suitable surface resistivity (Rs) value.

A ratio of the minor width length k of the minor axis cross-section of the flat acicular α-iron oxide to the mean particle diameter 1y of the granular nonmagnetic powder (k/1y) of from 0.3 to 2, preferably from 0.5 to 1.5, and still more preferably from 0.8 to 1.2, is desirable from the perspective of ability to inhibit the stacking of granular particles and flat acicular α-iron oxide powder.

A ratio of the lower layer thickness d to the major axis length 1x of the flat acicular α-iron oxide powder (d/1x) of from 0.05 to 25, preferably from 0.1 to 10, and still more preferably from 0.1 to 4 is desirable to improve orientation properties in the direction of thickness and render the surface smooth. When d/1x drops below 4, when present in the thickness direction, granular particles hardly be inserted between the particles of flat acicular α-iron oxide powder and both the flat acicular α-iron oxide particles and granular particles such as carbon black are present on the same flat surface. That is, the flat acicular α-iron oxide particles are randomly oriented within the surface and granular particles are present in the gaps therebetween. Thus, not only is the surface rendered smooth, but the strength of the lower layer in the width direction is increased, and it is possible to effectively flatten the upper magnetic layer during calendering, and running durability such as resistance to edge damage with repeat running when applied as a tape can be improved.

From such perspectives, inorganic compounds other than carbon black, such as titanium oxide, may be employed as the granular nonmagnetic particles. However, in this case as well, the particle diameter of the granular nonmagnetic particles must be equal to or less than 0.04 μm as specified in the present invention.

The content of flat acicular α-iron oxide powder preferably ranges from 10 to 95 parts, more preferably from 60 to 95 parts per 100 parts by weight of the total quantity of nonmagnetic powder. When the major axis length of the flat acicular α-iron oxide particles is made 1, the average thickness d of the nonmagnetic lower layer becomes thinner, the ratio d/1 drops, there is improvement with regard to entanglement of nonmagnetic particles, and variation in the orientation of the particles in the direction of thickness decreases.

The average thickness of the upper magnetic layer preferably ranges from 0.01 to 0.5 μm, more preferably from 0.04 to 0.3 μm, and most preferably from 0.04 to 0.15 μm. When the upper layer thickness exceeds 0.5 μm, the smoothening effect of the lower layer diminishes and smoothening of the magnetic layer surface tends to decrease.

To increase reduction of medium noise, employing a support in which wavelength roughness components of from 1 to 10 μm in the surface roughness of the side on which the magnetic layer will be provided have been reduced yields an even greater effect. When the ratio of lower layer thickness d to major axis length 1x of the flat acicular α-iron oxide powder (d/1x) is equal to or less than 4, the effect is even greater.

Flat acicular α-iron oxide powder can be manufactured by the method, as described in Japanese Unexamined Patent Publication (KOKAI) Heisei No. 10-340805, in which water-soluble Al salts and salts of other rare earth metals such as Y are added to a reaction system generating iron oxyhydroxide to prepare Co-containing iron oxyhydroxide in which Al, Y, and other rare earth metals have been dissolved as solids. In this process, flat acicular iron oxyhydroxide can be prepared by adjusting the proportion of Co/Al/Y and other rare earth metals. Flat acicular α-iron oxide can be prepared by sintering in $O_2$ gas.

In the Co-containing iron oxyhydroxide in which Al and rare earth metals such as Y are dissolved as solids, it is preferable that the Co content ranges from 5 to 50 atomic percent, preferably from 20 to 35 atomic percent; the Al content ranges from 0.1 to 12 atomic percent, preferably from 3 to 8 atomic percent; the content of rare earth metals such as Y ranges from 0.1 to 12 atomic percent, preferably from 3 to 8 atomic percent; and the atomic ratio of the Al content to the content of rare earth metals such as Y preferably ranges from 0.5 to 2 to effectively increase the ratio of the major width/minor width.

As described in Japanese Unexamined Patent Publication (KOKAI) Heisei No. 10-340447, it is also possible to prepare flat α-iron oxide by that water-soluble Al salts and Si salts are added to prepare the iron oxyhydroxide, and then this iron oxyhydroxide is sintered in $O_2$ gas. However, as described in Japanese Unexamined Patent Publication (KOKAI) Heisei No. 10-340805, the incorporation of Co/Al/Y or some other rare earth metal is preferred because it facilitates microgranulation and flatening.

The quantity of binder resin employed in the lower nonmagnetic layer ranges from 5 to 30 parts by weight per 100 parts by weight of total nonmagnetic powder to ensure moldability in the calendering process and dispersion in the liquid. When the quantity of binder resin becomes excessive, moldability in the calendering process tends to decrease. When the quantity of binder resin becomes excessively low, dispersion tends to decrease. Thus, the above-stated range is preferred.

When applying a thin lower layer, coating can be readily achieved by reducing the concentration of lower layer nonmagnetic liquid. However, when the concentration of the lower layer nonmagnetic liquid is decreased, a problem occurs in the form of aggregation of the nonmagnetic particles in the liquid. Thus, as a binder, it is further preferred to use polyurethane resin having a polar group, polyurethane comprising this polyurethane resin in a cyclic structure as well as an ether group, branched aliphatic polyester, polyurethane, polyurethane having a dimer diol structure, or the like is preferably employed as the binder. Since these binders are adsorbed onto the particle surfaces and form long molecular chains having adequate hardness, the gap between particles in the liquid can be widened and the aggregation property of the particles can be inhibited. Further, because aggregation of particles during coating and drying can be inhibited, a coating film with little aggregation turbulence of particles can be formed. One type or a mixture of these urethane resins may be employed. However, the compositional ratio of the urethane resin in the binder of the nonmagnetic layer is preferably equal to or higher than 10 weight percent, more preferably equal to or higher than 20 weight percent.

From the perspective of increasing granular orientation during coating, the solid component concentration of the liquid is further preferably adjusted to lower the ratio h/l of the magnetic liquid film h to the major axis length l of the flat acicular magnetic particles immediately after coating. Further, smoothing the magnetic layer surface with a smooth material at the stage where the coating has somewhat dried can increase the particle orientation in the upper and lower layers. When increasing the coating speed or employing an extrusion coating method, it is preferable that gither slit shapes are devised and a shearing force is applied to the coating liquid to break up aggregation of particles. Further, granular orientation can be further improved by moderating the initial drying of coating to inhibit vortex flow of the coating liquid.

Calendering is preferably conducted as follows. The initial roll nips are configured of metal rolls and the linear nip pressure is equal to or higher than 300 kg/cm, preferably equal to or higher than 400 kg/cm. The processing speed is equal to or less than 150 m/min, preferably equal to or less than 100 m/min, and still more preferably equal to or less than 30 m/min. The temperature ranges from 70 to 100° C. it is preferable to set the above conditions appropriately in consideration for the ease of molding the upper and lower layers affected by the Tg, kind and quantity of binder.

DETAILED EXPLANATION OF THE INVENTION

The magnetic layer of the magnetic recording medium of the present invention is described in greater detail below.

The magnetic recording medium of the present invention may be in the form of a single magnetic layer or multiple (multilayered) magnetic layers. In the case of multiple (multilayered) magnetic layers, the technique described in Japanese Unexamined Patent Publication (KOKAI) Heisei No. 6-139555 may be applied, for example.

In the magnetic recording medium of the present invention, since a saturated recording state occurs due to the comparative thinness of the magnetic layer, there would ideally be no variation in the thickness of the magnetic layer. However, a relation between the thickness d of the magnetic layer and the standard deviation $\sigma$ of the thickness of $\sigma/d \leq 0.5$ is permissible in practical terms, with $\sigma/d \leq 0.3$ being preferred. As described in Japanese Patent No. 2,566, 096, specific methods of reducing $\sigma$ are to render the lower layer nonmagnetic coating liquid thixotropic, employ acicular nonmagnetic powder in the lower layer, and employ a wet on dry method of coating the magnetic upper layer after coating and drying the nonmagnetic lower layer, and the like. The residual magnetization of the magnetic layer ranges from $6.28 \times 10^{-9}$ to $6.28 \times 10^{-8}$ T·m. The residual magnetization is optimized based on the recording and reproduction methods. There are various methods of setting the above-stated residual magnetization. For example, when the medium is being reproduced with an inductive head, the residual magnetization is set somewhat high within the above-mentioned range. When setting the magnetic layer somewhat thin (equal to or less than 0.1 $\mu$m, for example) due to O/W requirements, it is desirable to employ an alloy powder with a large (for example, 140 to 160 A·m$^2$/kg) $\sigma$s as the magnetic powder.

Further, when reproducing with an MR head, the number of particles is preferably increased and the residual magnetization is preferably set somewhat low within the above-stated range. In that case, it is appropriate that a magnetic powder with an $\sigma$s of from 50 to 130 A·m$^2$/kg is employed and the quantity of binder in the upper and lower layers is reduced, and the like to improve the fill density to the extent possible.

An alloy powder with an $\sigma$s of from 100 to 130 A·m$^2$/kg or hexagonal ferrite, magnetite, or Co-ferrite with an $\sigma$s of from 50 to 80 A·m$^2$/kg can be employed as the magnetic powder of the present invention.

In addition to prescribed atoms, the following atoms can be contained in the magnetic powder: Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, and the like. For improving thermal stability, Al, Si, Ta, Y, or the like may be adhered to the surface or dissolved therein as a solid. The addition of Co, Sm, Nd, or the like in a proportion of from 5 to 40 weight percent relative to Fe is well known especially to increase the Hc.

The magnetic powder may be pretreated prior to dispersion with dispersing agents, lubricants, surfactants, antistatic agents, and the like.

The size of the magnetic particles is as small as possible within the range not appearing the effect of thermal fluctuation, and does not depend on the reproduction head. Practically speaking, for acicular particles, a mean major axis length of from 0.05 to 0.2 $\mu$m and a minor axis length of from 0.01 to 0.025 $\mu$m are currently employed. In hexagonal ferrite, a plate diameter of from 0.01 to 0.2 $\mu$m and a thickness of from 0.001 to 0.1 $\mu$m are currently employed. The preferred range is not limited thereto; when advances in technology yield smaller particle sizes, those particles may be employed.

The coercive force Hc of the magnetic layer ranges from 119 to 318 kA/m, preferably from 143 to 279 kA/m, and more preferably from 159 to 239 kA/m. Thus, the above-described magnetic powder preferably has the same Hc.

The ferromagnetic metal powder employed in the present invention is not specifically limited. However, an alloy with Fe as its chief component is preferred. In addition to prescribed atoms, the following atoms can be contained in the ferromagnetic metal powder: Al, Mg, Si, S, Sc, Ca, Ti, V, Cr, Cu, Y, Mo, Rh, Pd, Ag, Sn, Sb, Te, Ba Ta, W, Re, Au, Hg, Pb, Bi, La, Ce, Pr, Nd, P, Co, Mn, Zn, Ni, Sr, B, and the like. The incorporation of at least one of the following in addition to Fe is particularly desirable: Al, Mg, Si, Ca, Y, Ba, La, Nd, Co, Ni, and B.

The ferromagnetic metal powder may be pretreated prior to dispersion with dispersing agents, lubricants, surfactants, antistatic agents, and the like, described further below. Specific examples are described in Japanese Examined Patent Publication (KOKOKU) Showa Nos. 44-14090, 45-18372, 47-22062, 47-22513, 46-28466, 46-38755, 47-4286, 47-12422, 47-17284, 47-18509, 47-18573, 39-10307 and 48-39639; and U.S. Pat. Nos. 3,026,215, 3,031,341, 3,100,194, 3,242,005, and 3,389,014.

The ferromagnetic metal powder may contain a small quantity of hydroxide or oxide. Ferromagnetic metal powders obtained by known manufacturing methods may be employed. The following are examples: methods of reduction with compound organic acid salts (chiefly oxalates) and reducing gases such as hydrogen; methods of reducing iron oxide with a reducing gas such as hydrogen to obtain Fe or Fe—Co particles or the like; methods of thermal decomposition of metal carbonyl compounds; methods of reduction by addition of a reducing agent such as sodium boron hydride, hypophosphite, or hydrazine to an aqueous solution of ferromagnetic metal; and methods of obtaining micropowder by vaporizing a metal in a low-pressure nonreactive gas. The ferromagnetic metal powders obtained in this manner may be subjected to any of the known slow oxidation treatments, such as immersion in an organic solvent followed by drying; the method of immersion in an organic solvent followed by formation of an oxide film on the surface by feeding in an oxygen-containing gas, then drying; and the method of forming an oxide film on the surface by adjusting the partial pressure of oxygen gas and a inert gas without using an organic solvent.

The specific surface area as measured by BET method of the ferromagnetic metal powder employed in the magnetic layer of the present invention is preferably selected from within the range of from 30 to 50 m$^2$/g. This permits both good surface properties and low noise.

The shape of the ferromagnetic metal powder is preferably acicular, with an flat acicular shape being particularly preferred. However, granular, rice-particle, and plate-shaped shapes are also permissible.

The mean major axis length of the ferromagnetic metal powder preferably ranges from 0.05 to 0.15 $\mu$m, more preferably from 0.08 to 0.12 $\mu$m.

The major axis length may be obtained by the method of taking transmission electron microscope photographs and directly reading the minor axis length and major axis length of the ferromagnetic powder from the photographs, and suitably combining the method of tracing transmission electron microscope photographs with an IBASSI image analyzer from Carl Zeiss Co. and reading them.

The acicular ratio of the ferromagnetic metal powder is preferably equal to or higher than 4 and equal to or less than 18, more preferably equal to or higher than 5 and equal to or less than 12. The moisture content of the ferromagnetic metal powder preferably ranges from 0.01 to 2 percent. The moisture content of the ferromagnetic metal powder is preferably optimized based on the type of binders employed.

The pH of the ferromagnetic metal powder is preferably optimized based on the combination of binders employed. The range is from 4 to 12, preferably from 7 to 10. As needed, Al, Si, P, or oxides thereof, and the like may be imparted to the surface of the ferromagnetic metal powder. The quantity thereof ranges from 0.1 to 10 weight percent with respect to the ferromagnetic metal powder. It is preferable that a surface treatment is applied, because the adsorption of lubricants such as fatty acids becomes equal to or less than 100 mg/m$^2$. Inorganic ions of soluble Na, Ca, Fe, Ni, Sr, and the like are sometimes incorporated into the ferromagnetic metal powder; characteristics are not particularly affected when the quantity thereof is equal to or less than 200 ppm.

Further, there are desirably few pores in the ferromagnetic metal powder employed in the present invention; the level thereof is equal to or less than 20 volume percent, preferably equal to or less than 5 volume percent.

Known binders may be employed in the magnetic upper layer. Examples are the binders described in Japanese Patent Publication Nos. 2566096 and 2571351. Functional groups ($SO_3M$, $PO_3M$, and the like) promoting adsorption with magnetic powder are desirably incorporated in the binder, with the incorporation of epoxy groups being further desirable. The molecular weight ranges from 10,000 to 100,000, preferably from 20,000 to 60,000. The quantity employed ranges from 5 to 25 parts, preferably from 5 to 20 parts, and still more preferably, from 5 to 15 parts per 100 parts by weight of magnetic powder.

Thermoplastic resins with a glass transition temperature ranging from −100 to 150° C., a number average molecular weight of from 1,000 to 200,000, preferably from 10,000 to 100,000, and a degree of polymerization of from about 50 to 1,000 may be employed as the binder in the magnetic layer. Examples of such resins are polymers and copolymers comprising structural units in the form of vinyl chloride, vinyl acetate, vinyl alcohol, maleic acid, acrylic acid, acrylic acid esters, vinylidene chloride, acrylonitrile, methacrylic acid, methacrylic acid esters, styrene, butadiene, ethylene, vinyl butyral, vinyl acetal, vinyl ether, and the like; polyurethane resin, and various gum-based resins.

Examples of thermosetting resins and reactive resins suitable for use as binders in the magnetic layer are phenol resins, epoxy resins, polyurethane hardening-type resins, urea resin, melamine resins, alkyd resins, acrylic reactive resins, formaldehyde resins, silicone resins, epoxy-polyamide resins, mixtures of polyester resins and isocyanate prepolymers, mixtures of polyester polyols and polyisocyanate, mixtures of polyurethane and polyisocyanate, and the like. These resins are described in detail in the Handbook of Plastics published by Asakura Shoten. It is also possible to employ known electron beam-cured resins in magnetic layers.

Examples thereof and methods of manufacturing the same are described in Japanese Unexamined Patent Publication (KOKAI) Showa No. 62-256219. The above-listed resins may be used singly or in combination. Preferred resins are combinations of polyurethane resin and at least one member selected from the group consisting of vinyl chloride resin; vinyl chloride—vinyl acetate copolymers; resins comprising individual repeating units derived from among the individual units of vinyl chloride, vinyl acetate, and vinyl alcohol; and vinyl chloride—vinyl acetate—maleic anhydride copolymers; or combinations of the same with polyisocyanate. Known structures of polyurethane resin can be employed, such as polyester polyurethane, polyether polyurethane, polyether polyester polyurethane, polycarbonate polyurethane, polyester polycarbonate polyurethane, polycaprolactone polyurethane, and polyolefin polyurethane. Polyurethanes comprised of short-chain diols having the above-described cyclic structure and long-chain diols comprising ester groups are particularly preferred. To obtain as needed better dispersibility and durability in all of the binders set forth above, it is desirable to use those introduced by copolymerization or addition reaction one or more polar groups selected from among —COOM, —$SO_3M$, —$OSO_3M$, —P=$O(OM)_2$, —O—P=$O(OM)_2$, (where M denotes a hydrogen atom or an alkali metal base), —OH, —$NR_2$, —$N^+R_3$, (where R denotes a hydrocarbon group), epoxy groups, —SH, —CN, sulfobetaine, phosphobetaine, and carboxybetaine. The quantity of the polar group is from $10^{-1}$ to $10^{-8}$ mol/g, preferably from $10^{-2}$ to $10^{-6}$ mol/g.

Specific examples of the binders employed in the present invention are VAGH, VYHH, VMCH, VAGF, VAGD, VROH, VYES, VYNC, VMCC, XYHL, XYSG, PKHH, PKHJ, PKHC, and PKFE from Union Carbide Corporation.; MPR-TA, MPR-TA5, MPR-TAL, MPR-TSN, MPR-TMF, MPR-TS, MPR-TM, and MPR-TAO from Nisshin Kagaku Kogyo K. K.; 1000W, DX80, DX81, DX82, DX83, and 100FD from Denki Kagaku Kogyo K. K.; MR-104, MR-105, MR110, MR100, and 400X-110A from Nippon Zeon Co.,Ltd.; Nippollan N2301, N2302, and N2304 from Nippon Polyurethane Industry Co.,Ltd.; Pandex T-5105, T-R3080, T-5201, Burnock D-400, D-210-80, Crisvon 6109, and 7209 from Dainippon Ink And Chemicals, Incorporated.; Vylon UR8200, UR8300, RV530, and RV280 from Toyobo Co.,Ltd.; Dipheramin 4020, 5020, 5100, 5300, 9020, 9022, and 7020 from DainichiSeika Colar & Chemicals Mfg. Co.,Ltd.; MX5004 from Mitsubishi Chemical Corp.; Sunprene SP-150 and TIM-3003 from Sanyo Chemical Industries,Ltd.; and Salan F310 and F210 from Asahi Chemical Industry Co.,Ltd. Of these, MR-104, MR110, UR-8200, UR8300, UR-8700, and polyurethanes that are reaction products, the principal starting materials of which are diols and organic diisocyanates and have cyclic structures and ether groups are preferred.

When polyurethane resins are employed in the present invention, the elongation at break preferably ranges from 100 to 2,000 percent, the stress at break preferably ranges from 4.9 to 980 kPa, and the yield point preferably ranges from 4.9 to 980 kPa.

Examples of polyisocyanates preferably employed in the present invention are tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, triphenylmethane triisocyanate, and other isocyanates; products of these isocyanates and polyalcohols; polyisocyanates produced by condensation of isocyanates; and the like. These isocyanates are commercially available under the following trade names, for example: Coronate L, Coronate HL, Coronate 2030, Coronate 2031, Millionate MR and Millionate MTL manufactured by Nippon Polyurethane Industry Co.Ltd.; Takenate D-102, Takenate D-110N, Takenate D-200 and Takenate D-202 manufactured by Takeda Chemical Industries Co.Ltd.; and Desmodule L, Desmodule IL, Desmodule N and Desmodule HL manufactured by Sumitomo Bayer Co. Ltd. They can be used singly or in combinations of two or more in both the nonmagnetic layer and the magnetic layer by exploiting differences in curing reactivity. The polyisocyanates are normally employed in a quantity of from 0 to 50 weight percent, preferably from 0 to 30 weight percent, per the total quantity of binder resin in the magnetic layer, and in a quantity of from 0 to 40 weight percent, preferably from 0 to 25 weight percent, per the total quantity of binder in the nonmagnetic layer.

When the magnetic recording medium of the present invention comprises two or more layers, it is of course possible to change the quantity of binder resin, the proportion of vinyl chloride resin, polyurethane resin, polyisocyanate, or some other resin in the binder, the molecular weight of each of the resins forming the magnetic layer, the quantity of polar groups, and the physical characteristics of the above-described resins and the like as needed. Known techniques about multilayered magnetic layers may be applied.

When carbon black is employed in the magnetic upper layer of the present invention, examples of types of carbon black that are suitable for use are: furnace black for rubber, thermal for rubber, black for coloring, and acetylene black. A specific surface area of from 5 to 500 $m^2/g$, a DBP oil absorption amount of from 10 to 400 mL/100 g, a particle diameter of from 5 nm to 300 nm, a pH of from 2 to 10, a moisture content of from 0.1 to 10 weight percent, and a tap density of from 0.1 to 1 g/mL are desirable. Specific examples of types of carbon black employed in the present invention are: BLACK PEARLS 2000, 1300, 1000, 900, 800, 700 and VULCAN XC-72 manufactured by Cabot Corporation; #80, #60, #55, #50 and #35 manufactured by Asahi Carbon Co. Ltd.; #2400B, #2300, #900, #1000, #30, #40 and #10B manufactured by Mitsubishi Kogyo Corp.; and CONDUCTEX SC, RAVEN 150, 50, 40 and 15 manufactured by Columbia Carbon Co.Ltd. The carbon black employed may be surface-treated with a dispersant or the like, or grafted with resin, or have a partially graphite-treated surface. The carbon black may be dispersed in advance into the binder prior to addition to the magnetic coating material. These carbon blacks may be used singly or in combination.

When employing carbon black, the quantity preferably ranges from 0.1 to 30 weight percent of the ferromagnetic powder.

In the magnetic layer, carbon black works to prevent static buildup, reduce the coefficient of friction, impart light-blocking properties, enhance film strength, and the like; the properties vary with the type of carbon black. Accordingly, it is, as a matter of course, possible for carbon black used in the present invention to properly use varying the kinds, quantity and combination between the upper magnetic layer and lower layer according to the purpose on the basis of the above-mentioned characteristics, such as particle size, oil absorption amount, electrical conductivity, and pH. For example, the *Carbon Black Handbook* compiled by the Carbon Black Association may be consulted for types of carbon black suitable for use in the magnetic layer of the present invention.

Known abrasives such as α-alumina and $Cr_2O_3$ may be incorporated into the magnetic layer. For wet-on-wet coating, the mean particle diameter is desirably equal to or higher than ⅓ and equal to or less than 5 times the thickness of the magnetic layer, and for wet-on-dry coating, the mean particle diameter is desirably equal to or higher than ⅓ and equal to or less than twice the thickness of the magnetic layer. An excessively large mean particle diameter causes thermal asperity. Since the abrasive tends particularly to protrude in wet-on-dry coatings, microparticles are preferred. Known techniques may be employed for pH and surface treatment.

In addition, solid lubricants (carbon with a particle diameter equal to or higher than 30 nm), fatty acids, fatty esters, and other liquid lubricants may be added to the magnetic layer.

The lower nonmagnetic layer will be described below.

The lower nonmagnetic layer of the magnetic recording medium of the present invention comprises flat acicular α-iron oxide powder and granular nonmagnetic powder with a mean particle diameter equal to or less than 0.04 µm. The flat acicular α-iron oxide powder is as described above. The nonmagnetic powder, in addition to flat acicular α-iron oxide powder, may also be a combination of acicular and plate-shaped nonmagnetic powders. However, controlling the employed amount of such powders is desirable to achieve the effect of the present invention. Further, granular nonmagnetic particles have a mean particle diameter equal to or less than 0.04 µm, preferably from 0.005 to 0.03 µm, and still more preferably, from 0.005 to 0.02 µm.

Specific examples of granular nonmagnetic powders that may be selected for use are carbon black, metal oxides, metal carbonates, metal sulfates, metal nitrides, metal carbides, metal sulfides, and other inorganic compounds. Particularly preferred inorganic compounds are those readily yielding microparticles, such as titanium dioxide, zinc oxide, zirconium oxide, tin oxide, ITO ($Sn/In_2O_3$) powder, silicon dioxide, boron nitride, and magnesium oxide.

The particle size of granular inorganic compound powders is measured in the same manner as that of ferromagnetic metal powders. The tap density ranges from 0.05 to 2 g/mL, preferably from 0.2 to 1.5 g/mL. The moisture content of granular inorganic compound powders ranges from 0.1 to 5 weight percent, preferably from 0.2 to 3 weight percent, and still more preferably from 0.3 to 1.5 weight percent. The pH of granular inorganic compound powders ranges from 2 to 11, with a pH of from 7 to 10 being particularly desirable. The specific surface area of the granular inorganic compound powders ranges from 1 to 100 $m^2/g$, preferably from 5 to 70 $m^2/g$, and still more preferably from 10 to 65 $m^2/g$. The crystalline size of the granular inorganic compound powders desirably ranges from 0.004 to 0.04 $\mu$m. The oil absorption amount using dibutyl phthalate (DBP) ranges from 5 to 100 mL/100 g, preferably from 10 to 80 mL/100 g, and still more preferably from 20 to 60 mL/100 g. The specific gravity ranges from 1 to 12, preferably from 3 to 6. The shape may be spherical, polyhedral, or plate-shaped.

It is considered that the ignition loss is desirably equal to or less than 20 weight percent, with no loss at all being most preferred. The Mohs' hardness of the above-mentioned nonmagnetic inorganic compound powder employed in the present invention is preferably equal to or higher than 4 and equal to or less than 10. The roughness factor of the powder surface preferably ranges from 0.8 to 1.5, more preferably from 0.9 to 1.2. The stearic acid (SA) adsorption amount of the above-mentioned nonmagnetic inorganic compound powders ranges from 1 to 20 $\mu$mol/$m^2$, preferably from 2 to 15 $\mu$mol/$m^2$. The heat of wetting in 25° C. water of the above-mentioned nonmagnetic inorganic compound powder is preferably within the range of from 20 to 60 $\mu$J/cm. A solvent with a heat of wetting within this range may also be employed. The quantity of water molecules on the surface at 100 to 400° C. suitably ranges from 1 to 10 pieces per 100 Angstroms. The pH of the isoelectric point in water preferably ranges from 3 to 9.

The surfaces of these nonmagnetic inorganic compound powders are preferably treated so that $Al_2O_3$, $SiO_2$, $TiO_2$, $ZrO_2$, $SnO_2$, $Sb_2O_3$, and ZnO are present. $Al_2O_3$, $SiO_2$, $TiO_2$, and $ZrO_2$ have particularly desirable dispersion properties. $Al_2O_3$, $SiO_2$, and $ZrO_2$ are even more preferred. These may be employed singly or in combination. Depending on the objective, a surface-treated coating layer with a coprecipitated material may also be employed, the coating structure which comprises a first alumina coating and a second silica coating thereover or the reverse structure thereof may also be adopted. Depending on the objective, the surface-treated coating layer may be a porous layer, but homogeneity and density are generally desirable.

Specific examples of granular nonmagnetic inorganic compound powders suitable for use in the nonmagnetic layer of the present invention are: titanium oxide TTO-51B, TTO-53B, TTO-55A, TTO-55B, TTO-55C, TTO-55S, TTO-55D, and SN-100 from Ishihara Sangyo Co.,Ltd.; UBE-100A and UBN-100A from Ube Industries Co.,Ltd.; HZN from Hokko Kagaku K. K.; RC and EP from Daiichi Kigenso Kogyo Co.,Ltd.; TZ-0 and TZ-3Y from Toso Co., Ltd.; and sintered products thereof.

The carbon black that is added to the nonmagnetic layer as granular nonmagnetic particles has, for example, a specific surface area of from 100 to 500 $m^2/g$, preferably from 150 to 400 $m^2/g$ and a DBP oil absorption amount of from 20 to 400 mL/100 g, preferably from 30 to 200 mL/100 g. The particle diameter of the carbon black is equal to or less than 0.04 $\mu$m, preferably from 0.01 to 0.03 $\mu$m, and still more preferably from 0.01 to 0.02 $\mu$m. The oil absorption level of the carbon black is equal to or less than 200 mL/100 g, preferably equal to or less than 100 mL/100 g. It is preferred for carbon black that the pH ranges from 2 to 10, the moisture content ranges from 0.1 to 10 percent, and the tap density ranges from 0.1 to 1 g/mL.

Specific examples of types of carbon black employed as granular nonmagnetic particles in the present invention are: BLACK PEARLS 2000, 1300, 1000, 900, 800, 880, 700, and VULCAN XC-72 from Cabot Corporation.; #3050B, #3150B, #3250B, #3750B, #3950B, #950, #650B, #970B, #850B, and MA-600 from Mitsubishi Chemical Corporation; CONDUCTEX SC, RAVEN 8800, 8000, 7000, 5750, 5250, 3500, 2100, 2000, 1800, 1500, 1255, and 1250 from Columbia Carbon Co.,Ltd.; and Ketjen Black EC from Lion Akzo Co.,Ltd. The carbon black employed can be surface treated with a dispersing agent or the like, grafted with a resin, or a portion of the surface may be graphite-treated. Further, the carbon black may be dispersed with a binder prior to being added to the coating material. These carbon blacks are employed in a range of from 5 to 50 parts by weight, preferably from 10 to 30 parts by weight, and more preferably from 15 to 25 parts by weight, per 100 parts by weight of the total nonmagnetic powder employed in the nonmagnetic layer. These carbon blacks may be employed singly or in combination.

The Carbon Black Handbook compiled by the Carbon Black Association may be consulted for types of carbon black suitable for use in the nonmagnetic layer.

When employed in combination with the above-described granular nonmagnetic inorganic compounds, it is appropriate that the total quantity of carbon black and the inorganic compounds ranges from 5 to 50 parts by weight per 100 parts by weight of the total quantity of nonmagnetic powder, and the quantity of carbon black ranges from 5 to 25 parts by weight, preferably from 5 to 20 parts by weight, and still more preferably from 5 to 15 parts by weight.

The same binder as employed in the magnetic upper layer may be employed in the nonmagnetic layer, but the incorporation of functional groups (listed above) enhancing dispersibility is further preferred. The molecular weight ranges from 20,000 to 50,000, preferably from 30,000 to 50,000. The calendering molding effect deteriorates when the molecular weight is excessively high. Surface treatment with aromatic phosphorus compounds promoting dispersion in the nonmagnetic powder is further effective. This is described in detail in Japanese Patent Nos. 2,566,088 and 2,634,792.

The binder weight B (L) in the lower nonmagnetic layer ranges from 12 to 30 parts, preferably from 15 to 25 parts, per 100 parts by weight of the total of the principal components in the form of flat acicular $\alpha$-iron oxide powder and granular nonmagnetic particles such as carbon black. A greater weight than that of the binder in the upper layer is desirably employed.

In the magnetic layer, carbon black works to prevent static, reduce the friction coefficient, impart light-blocking properties, enhance film strength, and the like; the properties vary with the type of carbon black. Accordingly, it is, as a matter of course, possible for carbon black used in the present invention to properly use varying the kinds, quantity and combination between the upper magnetic layer and lower layer according to the purpose on the basis of the above-mentioned characteristics, such as particle size, oil absorption amount, electrical conductivity, and pH. For example, the Carbon Black Handbook compiled by the Carbon Black Association may be consulted for the type of carbon black to employ in the magnetic layer of the present invention.

It is, as a matter of course, possible for the abrasive used in the present invention to properly use varying the kinds, quantity and combination between the magnetic layers (upper and lower layers) and nonmagnetic layer, according to the purpose. The abrasive employed in the magnetic layer suitably has a mean particle diameter of from 0.01 to 0.3 µm, preferably from 0.01 to 0.2 µm, and still more preferably from 0.01 to 0.1 µm. The quantity of abrasive that is added appropriately ranges from 0.1 to 10 parts by weight, preferably from 0.5 to 5 parts by weight, per 100 parts by weight of magnetic material. The abrasive is desirably first dispersed in binder to form a dispersion and the added to the magnetic coating material.

Substances having lubricating effects, antistatic effects, dispersion effects, plasticizing effects, or the like may be employed as additives in the present invention. Examples are: molybdenum disulfide; tungsten graphite disulfide; boron nitride; graphite fluoride; silicone oils; silicones having a polar group; fatty acid-modified silicones; fluorine-containing silicones; fluorine-containing alcohols; fluorine-containing esters; polyolefins; polyglycols; alkylphosphoric esters and their alkali metal salts; alkylsulfuric esters and their alkali metal salts; polyphenyl ethers; fluorine-containing alkylsulfuric esters and their alkali metal salts; monobasic fatty acids having 10 to 24 carbon atoms (which may contain an unsaturated bond or may be branched) and metal (e.g., Li, Na, K, Cu) salts thereof; monohydric, dihydric, trihydric, tetrahydric, pentahydric and hexahydric alcohols having 12 to 22 carbon atoms (which may contain an unsaturated bond or be branched); alkoxy alcohols having 12 to 22 carbon atoms; monofatty esters, difatty esters, or trifatty esters comprising a monobasic fatty acid having 10 to 24 carbon atoms (which may contain an unsaturated bond or be branched) and any one from among a monohydric, dihydric, trihydric, tetrahydric, pentahydric or hexahydric alcohol having 2 to 12 carbon atoms (which may contain an unsaturated bond or be branched); fatty esters of monoalkyl ethers of alkylene oxide polymers; fatty acid amides having 8 to 22 carbon atoms; and aliphatic amines having 8 to 22 carbon atoms.

Specific examples of compounds suitable for use are: lauric acid, myristic acid, palmitic acid, stearic acid, behenic acid, butyl stearate, oleic acid, linolic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, oleyl alcohol and lauryl alcohol. It is also possible to employ nonionic surfactants such as alkylene oxide-based surfactants, glycerin-based surfactants, glycidol-based surfactants and alkylphenolethylene oxide adducts; cationic surfactants such as cyclic amines, ester amides, quaternary ammonium salts, hydantoin derivatives, heterocycles, phosphoniums, or sulfoniums; anionic surfactants comprising acid groups such as carboxylic acid, sulfonic acid, phosphoric acid, sulfuric ester groups, and phosphoric ester groups; and ampholytic surfactants such as amino acids, amino sulfonic acids, sulfuric or phosphoric esters of amino alcohols, and alkyl betaines.

Details of these surfactants are described in "Surfactants Handbook" (published by Sangyo Tosho Co.,Ltd.). These lubricants, antistatic agents and the like need not be 100 percent pure and may contain impurities, such as isomers, unreacted materials, by-products, decomposition products and oxides in addition to the main components. These impurities are preferably comprised equal to or less than 30 weight percent, and more preferably equal to or less than 10 percent, by weight.

The lubricants and surfactants that are employed in the present invention may be employed differently in the lower layer and magnetic upper layer as needed based on type and quantity. For example, it is conceivable to control bleeding onto the surface through the use in the lower layer and the magnetic upper layer of fatty acids having different melting points, to control bleeding onto the surface through the use of esters having different boiling points and polarities, to improve coating stability by adjusting the amount of surfactant, and to enhance the lubricating effect by increasing the amount of the lubricant added to the nonmagnetic layer; this is not limited to the examples given here. All or some of the additives used in the present invention may be added at any stage of the process of manufacturing process the magnetic liquid. For example, they may be mixed with the ferromagnetic powder before a kneading step; added during a step of kneading the ferromagnetic powder, the binder, and the solvent; added during a dispersing step; added after dispersing; or added immediately before coating. Part or all of the additives may be applied by simultaneous or sequential coating after the magnetic layer has been applied to achieve a specific purpose. Depending on the objective, the lubricant may be coated on the surface of the magnetic layer after calendering or making slits.

Examples of the trade names of lubricants suitable for use in the present invention are: NAA-102, NAA-415, NAA-312, NAA-160, NAA-180, NAA-174, NAA-175, NAA-222, NAA-34, NAA-35, NAA-171, NAA-122, NAA-142, NAA-160, NAA-173K, hydrogenated castor oil fatty acid, NAA-42, NAA-44, Cation SA, Cation MA, Cation AB, Cation BB, Nymeen L-201, Nymeen L-202, Nymeen S-202, Nonion E-208, Nonion P-208, Nonion S-207, Nonion K-204, Nonion NS-202, Nonion NS-210, Nonion HS-206, Nonion L-2, Nonion S-2, Nonion K-4, Nonion O-2, Nonion LP-20R, Nonion PP-40R, Nonion SP-60R, Nonion OP-80R, Nonion OP-85R, Nonion LT-221, Nonion ST-221, Nonion OT-221, Monogly MB, Nonion DS-60, Anon BF, Anon LG, butyl stearate, butyl laurate, and erucic acid manufactured by NOF Corporation.; oleic acid manufactured Kanto Chemical Co.Ltd; FAL-205 and FAL-123 manufactured by Takemoto Oil & Fat Co.,Ltd.; NJLUB LO, NJLUB IPM, and Sansosyzer E4030 manufactured by New Japan Chemical Co.Ltd.; TA-3, KF-96, KF-96L, KF96H, KF410, KF420, KF965, KF54, KF50, KF56, KF907, KF851, X-22-819, X-22-822, KF905, KF700, KF393, KF-857, KF-860, KF-865, X-22-980, KF-101, KF-102, KF-103, X-22-3710, X-22-3715, KF-910 and KF-3935 manufactured by Shin-Etsu Chemical Co.Ltd.; Armide P, Armide C and Armoslip CP manufactured by Lion Armour Co.,Ltd.; Duomine TDO manufactured by Lion Corporation; BA-41G manufactured by Nisshin Oil Mills, Ltd.; Profan 2012E, Newpole PE61, Ionet MS-400, Ionet MO-200, Ionet DL-200, Ionet DS-300, Ionet DS-1000 and Ionet DO-200 manufactured by Sanyo Chemical Industries, Ltd.

The organic solvent employed in the present invention may be used in any ratio. Examples are ketones such as acetone, methyl ethyl ketone, methyl isobutyl ketone, diisobutyl ketone, cyclohexanone, isophorone, and tetrahydrofuran; alcohols such as methanol, ethanol, propanol, butanol, isobutyl alcohol, isopropyl alcohol, and methylcyclohexanol; esters such as methyl acetate, butyl acetate, isobutyl acetate, isopropyl acetate, ethyl lactate, and glycol acetate; glycol ethers such as glycol dimethyl ether, glycol monoethyl ether, and dioxane; aromatic hydrocarbons, such as benzene, toluene, xylene, cresol, and chlorobenzene; chlorinated hydrocarbons such as methylene chloride, ethylene chloride, carbon tetrachloride, chloroform, ethylene chlorohydrin, and dichlorobenzene; N,N-dimethylformamide; and hexane. These organic solvents need not be 100 percent pure and may contain impurities such as isomers, unreacted materials, by-products, decomposition products, oxides and moisture in addition to the main components. The content of these impurities is preferably equal to or less than 30 percent, more preferably equal to or less than 10 percent. Preferably the same type of organic solvent is employed in the present invention for the magnetic layer liquid and nonmagnetic layer liquid. However, the amount added may be varied. The stability of coating is increased by using a solvent with a high surface tension (such as cyclohexanone or dioxane) in the nonmagnetic layer. Specifically, it is important that the arithmetic mean value of the upper layer solvent composition not be less than the arithmetic mean value of the lower layer solvent composition. To improve dispersion properties, a solvent having a somewhat strong polarity is desirable. It is desirable that solvents having a dielectric constant equal to or higher than 15 is comprised equal to or higher than 50 percent of the solvent composition. Further, the dissolution parameter is desirably from 8 to 11.

The thickness of the flexible nonmagnetic support of the magnetic recording medium of the present invention is suitably from 1 to 100 $\mu$m, preferably from 4 to 80 $\mu$m. An undercoating layer can be provided between the flexible nonmagnetic support and the lower layer to improve adhesion.

The thickness of this undercoating layer is from 0.01 to 2 $\mu$m, preferably from 0.02 to 0.5 $\mu$m. In addition, a backcoat layer may be provided on the opposite side of the nonmagnetic support from the magnetic layer side. The thickness thereof is from 0.1 to 2 $\mu$m, preferably from 0.3 to 1.0 $\mu$m. Known undercoating layers and backcoat layers can be employed.

Known films can be employed as the flexible nonmagnetic support used in the present invention, including polyesters such as polyethylene terephthalate and polyethylene naphthalate, polyolefins, cellulose triacetate, polycarbonates, polyamides, polyimides, polyamidoimides, polysulfones, aramide, and aromatic polyamides. These supports may be subjected beforehand to corona discharge treatment, plasma treatment, adhesion enhancing treatment, heat treatment, dust removal, and the like.

A nonmagnetic flexible support is suitably employed that has a Power Spectrum Density of Roughness equal to or less than 0.5 nm$^2$, preferably equal to or less than 0.4 nm$^2$, more preferably equal to or less than 0.3 nm$^2$ at a wavelength of from 1 to 5 $\mu$m in the surface roughness spectrum measured by AFM, and a Power Spectrum Density of Roughness ranging from 0.02 to 0.5 nm$^2$, preferably from 0.04 to 0.3 nm$^2$ at a wavelength of from 0.5 to 1 $\mu$m. The shape of surface roughness can be freely controlled through the size and quantity of filler added to the support material, or by coating this filler dispersed in a binder. Examples of fillers are oxides and carbonates of Ca, Si, and Ti, as well as organic micropowders such as acrylic systems.

When the nonmagnetic support employed in the present invention is a tape, it is appropriate that the Young's modulus in the MD direction ranges from 3.92 to 14.7 GPa, preferably from 4.9 to 12.74 GPa, the Young's modulus in the TD direction ranges from 4.9 to 19.6 GPa, preferably from 6.86 to 17.64 GPa, and the ratio of TD/MD ranges from 1/1 to 1/5, preferably from 1/1 to 1/3.

The thermal shrinkage rate at 100° C. at 30 minutes in the tape running direction and the crosswise direction of the support is preferably equal to or less than 3 percent, more preferably equal to or less than 1.5 percent, and the thermal shrinkage rate at 80° C. at 30 minutes is preferably equal to or less than 1 percent, and more preferably equal to or less than 0.5 percent. The break strength in both directions preferably ranges from 0.049 to 0.98 GPa.

The process for manufacturing the magnetic coating liquid for the magnetic recording medium of the present invention comprises at least a kneading step, a dispersing step, and a mixing step to be carried out, if necessary, before or after the kneading and dispersing steps. Each of the individual steps may be divided into two or more stages. All of the starting materials employed in the present invention, including the ferromagnetic powder, binders, carbon black, abrasives, antistatic agents, lubricants, solvents, and the like, may be added at the beginning or during any of the steps. Moreover, the individual materials may be divided and added during two or more steps; for example, polyurethane may be divided and added in the kneading step, the dispersing step, and the mixing step for viscosity adjustment after dispersion.

Conventionally known-manufacturing techniques may of course be utilized for some of the steps. In the kneading step, only by using a kneader having a strong kneading force, such as a continuous kneader or a pressure kneader, it is possible to obtain the magnetic recording medium having the high residual magnetic flux density (Br). When a continuous kneader or pressure kneader is employed, the ferromagnetic powder and all or part of the binder (preferably equal to or higher than 30 percent of the entire quantity of binder) are kneaded in the range of from 15 to 500 parts by weight per 100 parts by weight of ferromagnetic powder. Details of the kneading treatment are described in Japanese Unexamined Patent Publication (KOKAI) Heisei No. 1-106338 and Japanese Unexamined Patent Publication (KOKAI) Showa No. 64-79274. When preparing the lower nonmagnetic layer liquid, a dispersing medium having a high specific gravity is desirably utilized, with zirconia beads being suitable.

The followings are examples of devices and methods for coating the magnetic recording medium having a multilayered structure of the present invention.

1. The lower layer is first applied with a coating device commonly employed to apply magnetic liquid such as a gravure coating, roll coating, blade coating, or extrusion coating device, and the upper layer is applied while the lower layer is still wet by means of a support pressure extrusion coating device such as is disclosed in Japanese Examined Patent Publication (KOKOKU) Heisei No. 1-46186 and Japanese Unexamined Patent Publication (KOKAI) Showa No. 60-238179 and Japanese Unexamined Patent Publication (KOKAI) Heisei No. 2-265672.

2. The upper and lower layers are applied nearly simultaneously by a single coating head having two built-in slits for passing coating liquid, such as is disclosed in Japanese Unexamined Patent Publication (KOKAI) Showa No. 63-88080, Japanese Unexamined Patent Publication (KOKAI) Heisei Nos. 2-17971, and 2-265672.

3. The upper and lower layers are applied nearly simultaneously using an extrusion coating apparatus with a backup roller as disclosed in Japanese Unexamined Patent Publication (KOKAI) Heisei No. 2-174965.

To prevent compromising the electromagnetic characteristics or the like of the magnetic recording medium by aggregation of magnetic powder, shear is desirably imparted to the coating liquid in the coating head by a method such as disclosed in Japanese Unexamined Patent Publication (KOKAI) Showa No. 62-95174 or Japanese Unexamined Patent Publication (KOKAI) Heisei No. 1-236968. In addition, the viscosity of the coating liquid must satisfy the numerical range specified in Japanese Unexamined Patent Publication (KOKAI) Heisei No. 3-8471. To obtain the magnetic recording medium of the present invention, orientation must be strongly conducted. A solenoid equal to or higher than 0.1 T (1,000 G) and a cobalt magnet equal to or higher than 0.2 T (2,000 G) are desirably employed together in orientation with like poles opposed each other. It is also desirable to provide a suitable drying step prior to orientation so as to achieve the highest orientation property following drying. Further, when the present invention is being applied as a disk medium, an orientation method achieving random orientation is rather required. Further, to vary the orientation directions of an upper magnetic layer and a lower magnetic layer, the directions of orientation do not necessarily have to be the longitudinal direction and the in-plane direction; orientation in the vertical direction and widthwise direction is also possible.

Heat-resistant plastic rollers of epoxy, polyimide, polyamide, polyimidoamide or the like are employed as calender processing rollers. Processing may also be conducted with metal rollers. The processing temperature is preferably equal to or higher than 70° C., more preferably equal to or higher than 80° C. Linear pressure is desirably 200 kg/cm, more preferably equal to or higher than 300 kg/cm. The friction coefficient for SUS420J of the magnetic layer surface of the magnetic recording medium of the present invention and its opposite surface is preferably equal to or less than 0.5, more preferably equal to or less than 0.3. The surface resistivity preferably ranges from $10^4$ to $10^{12}$ $\Omega$/sq, the modulus of elasticity at 0.5 percent elongation of the magnetic layer in both the running direction and the width direction preferably ranges from 0.98 to 19.6 GPa and the break strength preferably ranges from 0.098 to 2.94 MPa. The modulus of elasticity of the magnetic recording medium in both the running direction and the longitudinal direction preferably ranges from 0.98 to 14.7 GPa and the residual elongation is preferably equal to or less than 0.5 percent. The thermal shrinkage rate at any temperature equal to or less than 100° C. is preferably equal to or less than 1 percent, more preferably equal to or less than 0.5 percent, and most preferably equal to or less than 0.1 percent. The glass transition temperature (i.e., the temperature at which the loss elastic modulus of dynamic viscoelasticity as measured at 110 Hz peaks) of the magnetic layer is preferably equal to or higher than 50° C. and equal to or less than 120° C., and that of the lower nonmagnetic layer preferably ranges from 0° C. to 100° C. The loss elastic modulus preferably falls within a range of from $1 \times 10^7$ to $8 \times 10^8$ Pa and the loss tangent is preferably equal to or less than 0.2. Adhesion failure tends to occur when the loss tangent becomes excessively large.

The residual solvent in the magnetic layer is preferably equal to or less than 100 mg/m$^2$ and more preferably equal to or less than 10 mg/m$^2$, and the residual solvent contained in the second layer is preferably less than the residual solvent contained in the first layer. In both the nonmagnetic lower layer and the magnetic layer, the void ratio is preferably equal to or less than 30 volume percent, more preferably equal to or less than 20 volume percent. Although a low void ratio is preferable for attaining high output, there are some cases in which it is better to maintain a certain level. For example, in magnetic recording media for data recording where repeat applications are important, higher void ratios often result in better running durability. As regards the magnetic characteristics of the magnetic recording medium of the present invention, when measured under a magnetic field of 398 kA/m, squareness in the tape running direction is equal to or higher than 0.70, preferably equal to or higher than 0.80, and more preferably equal to or higher than 0.90. Squareness in the two directions perpendicular to the tape running direction is preferably equal to or less than 80 percent of the squareness in the running direction. The switching field distribution (SFD) of the magnetic layer is preferably equal to or less than 0.6. When data obtained by AFM measurement of the magnetic layer surface is fast Fourier transformed and the relation between the wavelength and the value of the square of the amplitude corresponding to that wavelength (referred to hereinafter as "Power", given in units of nm$^2$) is calculated, it is preferable that the Power at wavelengths of from 1 to 5 $\mu$m is equal to or less than 0.2 nm$^2$, and the Power at wavelengths of from 0.5 to 1.0 $\mu$m preferably ranges from 0.02 to 0.1 nm$^2$. To achieve a good CNR, the lower Power is better, but to improve running durability, it is necessary to keep the 0.5 to 1.0 $\mu$m wavelength Power to 0.02 to 1.0 nm$^2$.

The magnetic recording medium of the present invention comprises a lower nonmagnetic layer and an upper magnetic layer. It will be readily understood that the physical characteristics of the nonmagnetic layer and the magnetic layer can be changed based on the objective. For example, the magnetic layer can be imparted with a high modulus of elasticity to improve running durability while at the same time imparting to the nonmagnetic layer a lower modulus of elasticity than that of the magnetic layer to improve head contact with the magnetic recording medium. What physical characteristics to be imparted to two or more magnetic layers can be determined by consulting techniques relating to known magnetic multilayers. For example, there are many inventions imparting a higher Hc to the upper magnetic layer than to the lower layer, such as disclosed in Japanese Examined Patent Publication (KOKOKU) Showa No. 37-2218 and Japanese Unexamined Patent Publication (KOKAI) Showa No. 58-56228. However, making the magnetic layer thin as in the present invention permits recording even on a magnetic layer of comparatively high Hc.

[Embodiments]

The detailed contents of the present invention are described specifically below through embodiments. In the embodiments, "parts" denote "parts by weight".

(1) Nonmagnetic lower layer

| | |
|---|---|
| Nonmagnetic powder α-Fe$_2$O$_3$ (see Tables 1 and 2) | 85 parts |
| Carbon black | 15 parts |
| Mean primary particle diameter | 16 nm |
| DBP oil absorption amount | 80 mL/100 g |
| pH | 8.0 |
| Specific surface area by BET method | 250 m$^2$/g |
| Volatile component | 1.5 percent |
| Vinyl chloride copolymer | 7 parts |

-continued

| | |
|---|---|
| MR-110 from Nippon Zeon Co., Ltd. Polyester polyurethane resin Neopentylglycol/caprolactone polyol/MDI (4,4'-diphenylmethane diisocyanate) = 0.9/2.6/1 1 × 10⁻⁴ eq/g —SO₃Na group content | 5 parts |
| Butyl stearate | 1 part |
| Stearic acid | 1 part |
| Methyl ethyl ketone | 100 parts |
| Cyclohexanone | 50 parts |
| Toluene | 50 parts |
| Phenyl phosphonic acid (PPA) | 3 parts |

[0067]

(2) Magnetic layer

| | |
|---|---|
| Ferromagnetic metal micropowder | 100 parts |
| Composition | Fe/Co = 70/30 (atomic ratio) |
| Hc | 195 kA/m |
| Specific surface area by BET method | 43 m²/g |
| Crystalline size | 160 Å |
| Surface coating compound | Al₂O₃ |
| Particle size (major axis length) | 0.125 μm |
| Flat acicular particles, major width length (minor axis length)/minor width length = 0.025/0.01 | |
| σs: | 157 A · m²/kg |
| Polyester polyurethane resin Neopentylglycol/caprolactone polyol/MDI (4,4'-diphenylmethane diisocyanate) = 0.9/2.6/1 1 × 10⁻⁴ eq/g —SO₃Na group content | 10 parts |
| α-Alumina (particle size 0.18 μm) | 2.5 parts |
| Carbon black (particle size 0.10 μm) | 0.5 part |
| Butyl stearate | 1.5 parts |
| Stearic acid | 0.5 part |
| Methyl ethyl ketone | 90 parts |
| Cyclohexanone | 30 parts |
| Toluene | 60 parts |
| Phenyl phosphonic acid (PPA) | 5 parts |

Each of the above two coating liquids were dispersed using a sand mill after the individual components had been kneaded in a continuous kneader. Polyisocyanate was added to the dispersions obtained; three parts to the coating liquid for the nonmagnetic middle layer, and one part to the coating liquid for the upper magnetic layer. Forty parts of a mixed solvent of methyl ethyl ketone and cyclohexanone was added to each liquid. Each liquid was then filtered using a filter having a mean pore diameter of 1 μm to prepare coating liquids for forming a nonmagnetic layer, an upper magnetic layer, and a lower magnetic layer. Simultaneous multilayer coating on a polyester naphthalate support was conducted by applying the coating liquid for the nonmagnetic layer in a manner yielding the dried thickness indicated in Table 2 and applying thereover immediately thereafter the magnetic layer to the thickness indicated in Table 2. The polyester naphthalate support has 0.03 nm² of the AFM power spectrum density of roughness at a wavelength of 4.3 μm and 5.2 μm of the thickness. While the two layers were still wet, orientation was imparted with a cobalt magnet having a magnetic force of 0.3 T and a solenoid having a magnetic force of 0.15 T. After drying, a seven-stage calender comprised of only metal rollers was used for processing at 85° C., a pressure of 350 kg/cm, and a speed of 50 m/min, and slits 6.35 mm in width were made to manufacture a popular DVC videotape.

The characteristics of videotapes of embodiments and comparative examples obtained as set forth above were measured by the following methods; the results are given in Table 2.

[Measurement Methods]

Average thickness d of magnetic layer and nonmagnetic layer and standard deviation σ thereof:

The average thickness d and standard deviation of thickness σ were measured by the following methods for the multilayered structure.

The magnetic recording medium was cut to a thickness of about 0.1 μm with a diamond cutter in the longitudinal direction, the cut sections were observed with a transmission electron microscope at a magnification of from 10,000 to 100,000 times, preferably from 20,000 to 50,000 times, and photographed. The photograph print size was A4 to A5. Subsequently, differences in shape between the ferromagnetic metal powder of the magnetic layer and the nonmagnetic inorganic powder of the nonmagnetic layer were noted to visually determine the interface between the magnetic and nonmagnetic layers, which was marked in black. The outer surface of the magnetic layer was also similarly marked in black. Subsequently, an IBAS2 image processor from Zeiss Co. was used to measure the length of the marked black lines. For a photographic sample 21 cm in length, 85 to 300 measurements were made. The average value of the values thus measured was represented by d, and standard deviation σ was calculated from the following equation:

$$\sigma = [\{(d1-d)^2 + (d2-d)^2 + \ldots + (dn-d)^2\}/(n-1)]^{1/2}$$

where d1, d2 . . . dn denote individual measured values and n is 85–300.

Similarly, the sample tape was cut in the direction of width and observed and photographed under a magnification of 500,000 times to confirm the form of the nonmagnetic particles.

Magnetic properties (Hc, SFD, SQ, Bm, Φm): Measurements were made at an applied magnetic field of Hm 796 A/m using a vibrating sample magnetometer (from Toei Kogyo Co.,Ltd.). Bm was calculated from the above-described average thickness of the magnetic layers and Φm.

Ra: An optical interference-type surface roughness meter in the form of a Digital Optical Profiler HD-2000 from WYKO Co. was employed to take measurements of subject surfaces with a 50× object lens, 0.5× intermediate lens, and measurement range of 242 μm×184 μm. The measurement results yielded basic data that was slope corrected and cylinder corrected. The center-surface average surface roughness Ra (unit: nm) ws calculated from this basic data.

PSD: The measurement surfaces were measured with the above-mentioned HD-2000 and the data obtained was fast Fourier transformed to calculate the relation between wavelength and power. The following value was taken as the power of the above-stated function: the value (referred to hereinafter as the "1D-PSD", given in units of nm³) of the square of the amplitude to the given wavelength divided by the frequency in the form of the reciprocal number of that wavelength. ID-PSDs were calculated from each wavelength of 5 μm and 10 μm.

AFM/PSD-4.3 μm: An interatomic power microscope Nanoscope 3 unit from Digital Instruments was employed to measure a measured surface in the form of a 30 μm×30 μm square with a quadrangular pyramid probe made of SiN and having a ridge degree of 70. The data obtained was fast Fourier transformed to calculate the relation between wavelength and power. The following value was employed as the power at the time. The value of the square of the amplitude to a given wavelength (this value is referred to hereinafter as the "power", given in units of nm$^2$) was taken as the power of the above-stated function. The Power was calculated for a wavelength of 4.3 μm.

AFM surface protrusions: 40 nm ↑: The surface roughness of a 30 μm square was measured with a quadrangular pyramid probe made of SiN and having a ridge degree of 70 using a Nanoscope 3 unit from Digital Instruments Co. In this AFM surface roughness measurement, the number of protrusions extending to a height equal to or higher than 40 nm above the reference surface was counted.

AFM surface protrusions: 20 nm ↑: The number of protrusions extending to a height equal to or higher than 20 nm above the reference surface was counted in the same manner as for 40 nm ↑.

DVC 1/2 Tb output, total C/N, medium C/N: The 1/2 Tb C/N was measured with a drum tester. The head employed was a recording use MIG head with a Bs of 1.2 T and a gap length of 0.22 μm. The head-to-medium relative speed during recording and reproduction was 10.5 m/sec. A 21 MHz single-frequency was recorded. The reproduction spectrum was measured with a spectrum analyzer from Shibasoku Co.,Ltd. The total C/N was taken as the ratio of 21 MHz carrier output to 18.7 MHz noise. The medium C/N was calculated by subtracting the amplifier noise from the above.

Strength measurement of the coating film layer in the width direction: From the sheet sample calendered, a sample having a width of 6.35 mm and a length of 10 cm was cut out in the width direction. A Tensilon STM-T—50BP from Toyo-Baldwin Co. was employed to measure Young's modulus of tension at a speed of 100 nm/min. Subsequently, samples in which the coating layer had been stripped with a solvent were similarly prepared, the Young's moduli thereof were measured, and from the respective Young's moduli and changes in thickness, the Young's modulus of the coating layer was obtained.

TABLE 1

Nonmagnetic Powder

| Characteristics of Powder | | Powder A: α-iron oxide | Powder B: α-iron oxide | Powder C: iron oxyhydroxide |
|---|---|---|---|---|
| Shape | Shape of particle | Acicular particles | Flat acicular particles | Flat acicular particles |
| | Shape of particle cross-section | Round | Elliptic | Elliptic |
| | Major axis length: μm | 0.11 | 0.125 | 0.125 |
| | Minor axis length: μm (major width length) | 0.02 | 0.024 | 0.024 |
| | Ratio of major width/minor width of particle cross-section | 1 | 2.4 | 2.4 |
| | SBET (m2/g) | 51 | 40 | 62 |
| Elemental composition (atomic percent) | Co/Fe | 0 | 29 | 29 |
| | Al/Fe | 5.9 | 5.9 | 5.9 |
| | Si/Fe | 0.10 | 0.10 | 0.10 |
| | Y/Fe | 0 | 8.3 | 8.3 |
| | Sm/Fe | 0 | 0 | 0 |
| | Mg/Fe | 0 | 0.7 | 0.7 |
| | Ca/Fe | 0.01 | 0.03 | 0.03 |
| | Na/Fe | 0.01 | 0 | 0 |
| Other | pH | 9.0 | 9.1 | 9.1 |

TABLE 2

| | Embodiment 1 | Embodiment 2 | Embodiment 3 | Embodiment 4 | Embodiment 5 | Comparative Example 1 | Comparative Example 2 |
|---|---|---|---|---|---|---|---|
| Lower layer: main powder: X | B | → | → | → | → | C | A |
| Secondary powder: Y | #950B | → | → | → | → | None | #950B |
| X/Y ratio: WT % | 85/15 | → | → | 60/40 | 95/5 | 100/0 | 85/15 |
| Upper magnetic layer thickness d: μm | 0.1 | → | 0.3 | 0.1 | 0.1 | 0.1 | 0.1 |
| Lower nonmagnetic layer thickness: μm | 1.4 | 0.4 | → | → | → | → | 1.4 |
| Magnetic characteristics of tape: Hc (kA/m) | 181 | 178 | 176 | 177 | 180 | 185 | 183 |
| SFD | 0.19 | 0.18 | 0.18 | 0.18 | 0.17 | 0.20 | 0.2 |
| SQ | 0.89 | 0.90 | 0.90 | 0.90 | 0.90 | 0.90 | 0.88 |
| Bm (T) | 0.68 | 0.72 | 0.64 | 0.66 | 0.76 | 0.6 | 0.63 |
| Surface property of magnetic layer: Ra (nm) | 1.9 | 1.7 | 2.4 | 2.1 | 1.9 | 2.8 | 2.1 |
| PSD: 10 μm (nm$^3$) | 4000 | 2800 | 7000 | 4800 | 3000 | 4000 | 6000 |
| PSD: 5 μm (nm$^3$) | 900 | 700 | 1000 | 950 | 800 | 1200 | 1000 |
| ARM/PSD - 4.3 μm (nm$^2$) | 0.25 | 0.12 | 0.30 | 0.28 | 0.13 | 0.5 | 0.35 |
| AFM surface protrusions: 40 nm ↑ | 0 | 0 | 1 | 1 | 0 | 1 | 0 |
| AFM surface protrusions: 20 nm ↑ | 12 | 10 | 20 | 14 | 12 | 35 | 24 |
| Young's modulus in the width direction of coated layer: S-S measurement (GPa) | 7.84 | 9.31 | 9.8 | 1.03 | 8.82 | 4.9 | 6.37 |

TABLE 2-continued

|  | Embodiment 1 | Embodiment 2 | Embodiment 3 | Embodiment 4 | Embodiment 5 | Comparative Example 1 | Comparative Example 2 |
|---|---|---|---|---|---|---|---|
| DVC 1/2 Tb output | 0.5 | 0.5 | 0 | 0.2 | 0.8 | −0.5 | 0 |
| DVC 1/2 total C/N | −1.1 | −0.6 | −1.1 | −1.2 | 0.3 | −2.0 | −1.6 |
| DVC 1/2 medium C/N | −2.4 | −1.2 | −2.8 | −3.2 | −0.6 | −4.5 | −4.0 |

The following came out from the results in Table 2.

Comparative Example 1 was a sample in which flat acicular iron oxyhydroxide having the same particle shape and size as the present invention was employed in the lower layer, and was representative of the embodiment described in Japanese Unexamined Patent Publication (KOKAI) Heisei No. 10-340447. This sample had a high Ra for the magnetic layer surface, the PSD at a wavelength of 5 µm and the AFM/PSD at a wavelength of 4.3 µm were high, and there were many 20 µm ↑ AFM surface protrusions. Accordingly, the DVC 1/2 Tb output was low, and the total C/N and medium C/N ratios were low. Comparative Example 2 was a conventionally known sample employing acicular α-iron oxide with a round granular cross-section rectangular to the major axis and carbon black in the lower layer. Although not to the extent seen in Comparative Example 1, the AFM/PSD at a wavelength of 4.3 µm was still high, furthermore there were many 20 µm ↑ AFM surface protrusions, and the total C/N and medium C/N ratios were low.

By contrast, each of the samples of Embodiments 1 to 5 of the present invention had a low Ra, low PSD at a wavelength of 5 µm, low AFM/PSD at a wavelength of 4.3 µm, and few 20 µm ↑ AFM surface protrusions. Accordingly, the DVC 1/2 Tb output, total C/N, and medium C/N were all high, and these samples were found to be magnetic recording media with high C/N (low noise) ratios at high output.

Based on the present invention, a magnetic recording medium can be provided that exhibits high output and a high C/N (low noise) ratio in high-density magnetic recording. In particular, as exhibited by the embodiments, the present invention provides a magnetic recording medium with a high DVC 1/2 Tb output, a high total C/N ratio, a high medium C/N ratio, and a high C/N (low noise) ratio at high output.

The present disclosure relates to the subject matter contained in Japanese Patent Application No. 2000-255365 filed on Aug. 25, 2000, which is expressly incorporated herein by reference in its entirety.

What is claimed is:

1. A magnetic recording medium which comprises a nonmagnetic lower layer comprising a nonmagnetic powder and a binder and a magnetic layer comprising a ferromagnetic powder and a binder provided in this order on a flexible nonmagnetic support, wherein said nonmagnetic lower layer comprises flat acicular α-iron oxide powder and granular nonmagnetic particles and said flat acicular α-iron-oxide powder has a major axis length ranging from 0.05 to 0.5 µm and a ratio of the major width m to the minor width k of the minor axis cross-section when sectioned at an angle perpendicular to the major axis (m/k) being higher than 1, and said granular nonmagnetic particles have a mean particle diameter equal to or less than 0.04 µm.

2. The magnetic recording medium of claim 1 wherein said granular nonmagnetic particles are carbon black.

3. The magnetic recording medium of claim 2 wherein said carbon black contained in said nonmagnetic lower layer ranges from 5 to 50 parts by weight per 100 parts by weight of the total quantity of said nonmagnetic powder.

4. The magnetic recording medium of claim 1 wherein said flat acicular α-iron oxide powder has a major axis length ranging from 0.07 to 0.3 µm.

5. The magnetic recording medium of claim 1 wherein said flat acicular α-iron oxide powder has a ratio of the major width m to the minor width k (m/k) ranging from 1.5 to 8.

6. The magnetic recording medium of claim 1 wherein said flat acicular α-iron oxide powder has a ratio of the minor width k to the major axis length 1x of the powder (1x/k) being equal to or higher than 5.

7. The magnetic recording medium of claim 1 wherein a ratio of the major axis length 1x of said flat acicular α-iron oxide powder to the mean particle diameter 1y of said granular nonmagnetic powder (1x/1y) is equal to or higher than 3.

8. The magnetic recording medium of claim 1 wherein a ratio of the major width m to the mean particle diameter 1y of said granular nonmagnetic powder (m/1y) ranges from 0.5 to 10.

9. The magnetic recording medium of claim 1 wherein a ratio of the minor width k to the mean particle diameter 1y of said granular nonmagnetic powder (k/1y) ranges from 0.3 to 2.

10. The magnetic recording medium of claim 1 wherein a ratio of thickness d of said nonmagnetic lower layer to the major axis length 1x of said flat acicular α-iron oxide powder (d/1x) ranges from 0.05 to 25.

11. The magnetic recording medium of claim 1 wherein said flat acicular α-iron oxide powder contained in said nonmagnetic lower layer ranges from 10 to 95 parts by weight per 100 parts by weight of the total quantity of said nonmagnetic powder.

* * * * *